United States Patent
Tsubaki

(10) Patent No.: US 10,043,245 B2
(45) Date of Patent: Aug. 7, 2018

(54) IMAGE PROCESSING APPARATUS, IMAGING APPARATUS, CONTROL METHOD, AND INFORMATION PROCESSING SYSTEM THAT EXECUTE A RE-ANTI-SHAKE PROCESS TO REMOVE NEGATIVE INFLUENCE OF AN ANTI-SHAKE PROCESS

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 436 days.

(21) Appl. No.: 14/698,967

(22) Filed: Apr. 29, 2015

(65) Prior Publication Data
US 2015/0326785 A1 Nov. 12, 2015

(30) Foreign Application Priority Data

May 12, 2014 (JP) .................................. 2014-098296

(51) Int. Cl.
*G06T 5/00* (2006.01)
*H04N 5/232* (2006.01)
*G06T 7/20* (2017.01)

(52) U.S. Cl.
CPC .............. *G06T 5/003* (2013.01); *G06T 5/006* (2013.01); *G06T 7/20* (2013.01); *H04N 5/2328* (2013.01);
(Continued)

(58) Field of Classification Search
CPC ........... G06T 5/003; G06T 2207/10016; G06T 2207/10024; G06T 2207/20024;
(Continued)

(56) References Cited

U.S. PATENT DOCUMENTS 5,982,421 A * 11/1999 Inou ................... H04N 5/23248 348/208.5
8,294,773 B2 * 10/2012 Oshino .............. H04N 5/23248 348/208.6

(Continued)

FOREIGN PATENT DOCUMENTS

JP 2009-302762 A 12/2009
JP 2013-520717 A 6/2013

OTHER PUBLICATIONS

Titterton, David H., and John L. Weston, "Strapdown Inertial Navigation Technology—2nd Edition," The Institution of Electrical Engineers, 2004.

(Continued)

*Primary Examiner* — Twyler Haskins
*Assistant Examiner* — Akshay Trehan
(74) *Attorney, Agent, or Firm* — Fitzpatrick, Cella, Harper & Scinto

(57) ABSTRACT

An image processing apparatus includes at least one processor operatively coupled to a memory. A first anti-shake unit executes an anti-shake process on image data relating to a captured image, and to record image data after the anti-shake process on a recording unit. A second anti-shake unit executes a re-anti-shake process while performing a control process of removing influence of the anti-shake process, which adversely affects the re-anti-shake process executed by the second anti-shake unit, executed by the first anti-shake unit on the image data, after the anti-shake process recorded on the recording unit, based on auxiliary information regarding the anti-shake process output by the first anti-shake unit.

11 Claims, 10 Drawing Sheets

(52) U.S. Cl.
CPC ..... *H04N 5/23248* (2013.01); *H04N 5/23254* (2013.01); *H04N 5/23258* (2013.01); *H04N 5/23261* (2013.01); *H04N 5/23267* (2013.01); *G06T 2207/10016* (2013.01); *G06T 2207/10024* (2013.01); *G06T 2207/20024* (2013.01); *G06T 2207/20201* (2013.01)

(58) Field of Classification Search
CPC ............ G06T 2207/20201; G06T 7/20; H04N 5/23264; H04N 5/23267; H04N 5/2328; H04N 5/23287; H04N 5/23248
See application file for complete search history.

(56) References Cited

U.S. PATENT DOCUMENTS

| | | | |
|---|---|---|---|
| 8,896,715 B2 | 11/2014 | Wu et al. | |
| 2008/0037970 A1* | 2/2008 | Saito | G03B 5/00 396/55 |
| 2009/0066799 A1* | 3/2009 | Whitcombe | H04N 5/23248 348/208.5 |
| 2009/0316010 A1* | 12/2009 | Nomura | G03B 5/00 348/208.6 |
| 2010/0033584 A1* | 2/2010 | Watanabe | G06T 3/0062 348/208.13 |
| 2010/0215353 A1* | 8/2010 | Hashi | G03B 5/00 396/55 |
| 2010/0265343 A1* | 10/2010 | Lee | G02B 27/646 348/208.7 |
| 2010/0295956 A1* | 11/2010 | Goto | H04N 5/23248 348/208.6 |
| 2011/0149096 A1* | 6/2011 | Matsuyama | H04N 5/23248 348/208.6 |
| 2012/0108292 A1* | 5/2012 | Zhong | H04N 5/23258 455/556.1 |
| 2012/0320227 A1* | 12/2012 | Tsuchida | H04N 5/23274 348/208.99 |
| 2013/0169833 A1* | 7/2013 | Omori | H04N 5/23254 348/208.6 |
| 2014/0185882 A1* | 7/2014 | Masuura | H04N 5/23254 382/107 |
| 2015/0036010 A1 | 2/2015 | Wu et al. | |
| 2015/0123990 A1* | 5/2015 | Satoh | H04N 5/23248 345/625 |
| 2015/0365593 A1* | 12/2015 | Shinozaki | H04N 5/23229 348/207.1 |
| 2016/0057352 A1* | 2/2016 | Yoneda | H04N 5/23251 348/208.4 |

OTHER PUBLICATIONS

Madwick, Seb., "Gait tracking with x-IMU," posted Sep. 2, 2013, http://www.x-io.co.uk/gait-tracking-with-x-imu/, accessed Jul. 15, 2015, two pages.
Triggs, Bill. "Autocalibration from Planar Scenes," INRIA, (Proceedings of the 5th European Conference on Computer Vision, Jun. 1998 (ECCV98), pp. 1-20.
Harris, Chris and Mike Stephens. "A Combined Corner and Edge Detector," Fourth Alvey Vision Conference, 1988, pp. 147-1151.
Hartley, Richard and Andrew Zisserman, Multiple View Geometry in computer vision, Second Edition, Cambridge University Press, 2000, 2003, pp. 25-44.
Feng, Liu, et al. "Content-Preserving Warps for 3D Video Stabilization," ACM SIGGRAPH Conference Proceedings, 2009, pp. 1-9.
Triggs, Bill. "Routines for Relative Pose of Two Calibrated Cameras from 5 Points," [Technical Report] Jul. 23, 2000, <inria-00548287>, pp. 1-13.
Madgwick, Sebastian O.H. "An efficient orientation filter for inertial and inertial/magnetic sensor arrays," Apr. 30, 2010, pp. 1-32.

* cited by examiner

IMAGE PROCESSING APPARATUS, IMAGING APPARATUS, CONTROL METHOD, AND INFORMATION PROCESSING SYSTEM THAT EXECUTE A RE-ANTI-SHAKE PROCESS TO REMOVE NEGATIVE INFLUENCE OF AN ANTI-SHAKE PROCESS

CLAIM OF PRIORITY

This application claims the benefit of Japanese Patent Application No. 2014-098296, filed May 12, 2014, which is hereby incorporated by reference herein in its entirety.

BACKGROUND OF THE INVENTION

Field of the Invention

The present invention relates to an image processing apparatus, an imaging apparatus, a control method, and an information processing system.

Description of the Related Art

With recent increases in the numbers of pixels and performance of cameras, a more advanced anti-shake process for a moving image is required. An anti-shake process is a process of correcting shake (image shake) that occurs in a captured image due to shake of a device. Meanwhile, performance of an SOC (system on a chip) including a CPU or a GPU and a memory in cameras can be improved, and remote and distributed processing utilizing a communication device such as a WiFi device, including a pioneering smartphone, can be performed. Accordingly, a plurality of various anti-shake processing units are mounted, and an optimal process according to a video can be adaptively selected or external resources such as a PC or a cloud service can be utilized for the anti-shake process in addition to the image pickup apparatus.

PCT Japanese Translation Patent Publication No. 2013-520717 discloses a digital video stabilization method in which light processing for real time and heavy processing for offline processing are adaptively switched according to shake conditions of a video by an execution platform. Further, Japanese Unexamined Patent Application Publication No. 2009-302762 discloses a camera system in which an image pickup apparatus records image data not subjected to an anti-shake process, and an external device connected to the image pickup apparatus over a network performs the anti-shake process on the image data offline.

In the technology in which the image pickup apparatus stores only a non-anti-shake video without performing a real-time anti-shake process, and the anti-shake is performed offline, as discussed in Japanese Patent Laid-Open No. 2009-302762, a demand of a user desiring to view a video on which anti-shake has been completed immediately after photography is not solved.

Meanwhile, attempting to improve performance of anti-shake amid restrictions on real-time anti-shake in an image pickup apparatus leads to complexity or an increase in resources, that is, an increase in cost due to sophistication of processing, and originally makes realization of the real-time anti-shake difficult. Further, there are primordial restrictions that future information for current frame processing that is useful in a filtering process, or the like, is not available due to delay of displaying of a processing result, or the like, or restrictions on selection of available processing. Therefore, it is difficult primordially, and, in terms of cost, to realize better performance in real-time processing than in offline processing in the device.

Therefore, an image pickup apparatus applying optical anti-shake or electronic anti-shake in real time and then performing re-anti-shake offline can be considered. However, in an image pickup apparatus that performs electronic anti-shake, it is necessary to perform video recording in consideration of margin pixels, and an extra area is processed and recorded. Therefore, this adds a load to power or a bus configuration and leads to an increase in cost of circuitry or a memory. Further, in a video subjected to optical anti-shake or electronic anti-shake, since the shake is removed midway, it is difficult for a shake trajectory of the camera, which is an image shake factor, to be estimated. That is, it is not determined whether shake of the video is caused by a rotational or a translational motion of the image pickup apparatus. Therefore, even when an advanced anti-shake process conforming to a camera model, in which multi-axis camera motion is assumed, is applied to an anti-shake completion video offline, an accurate anti-shake process is not achieved. In such a case, capturing an image takes much attention and effort using, for example, a Steadicam®, or the like, to reduce the shake without applying the optical anti-shake or the electronic anti-shake, and advanced camera trajectory analysis, in which so called Match Move™ should be performed later, and the anti-shake process should be applied.

SUMMARY OF THE INVENTION

The present invention provides an image processing apparatus that enables a user to view a video on which anti-shake has been completed immediately after photography, and is capable of accurately realizing a re-anti-shake process.

An image processing apparatus of an embodiment of the present invention includes a first anti-shake unit that executes an anti-shake process on image data relating to a captured image, and records image data after the anti-shake process on a recording unit, and a second anti-shake unit that executes a re-anti-shake process while performing a control process of removing influence of the anti-shake process executed by the first anti-shake unit on the image data after the anti-shake process recorded on the recording unit based on auxiliary information regarding the anti-shake process output by the first anti-shake unit.

According to the image processing apparatus of the present invention, a user can view a video on which anti-shake has been completed immediately after photography, and the offline re-anti-shake process can be performed accurately.

Further features of the present invention will become apparent from the following description of exemplary embodiments with reference to the attached drawings.

DESCRIPTION OF THE EMBODIMENTS

Embodiment 1

Figure 1:
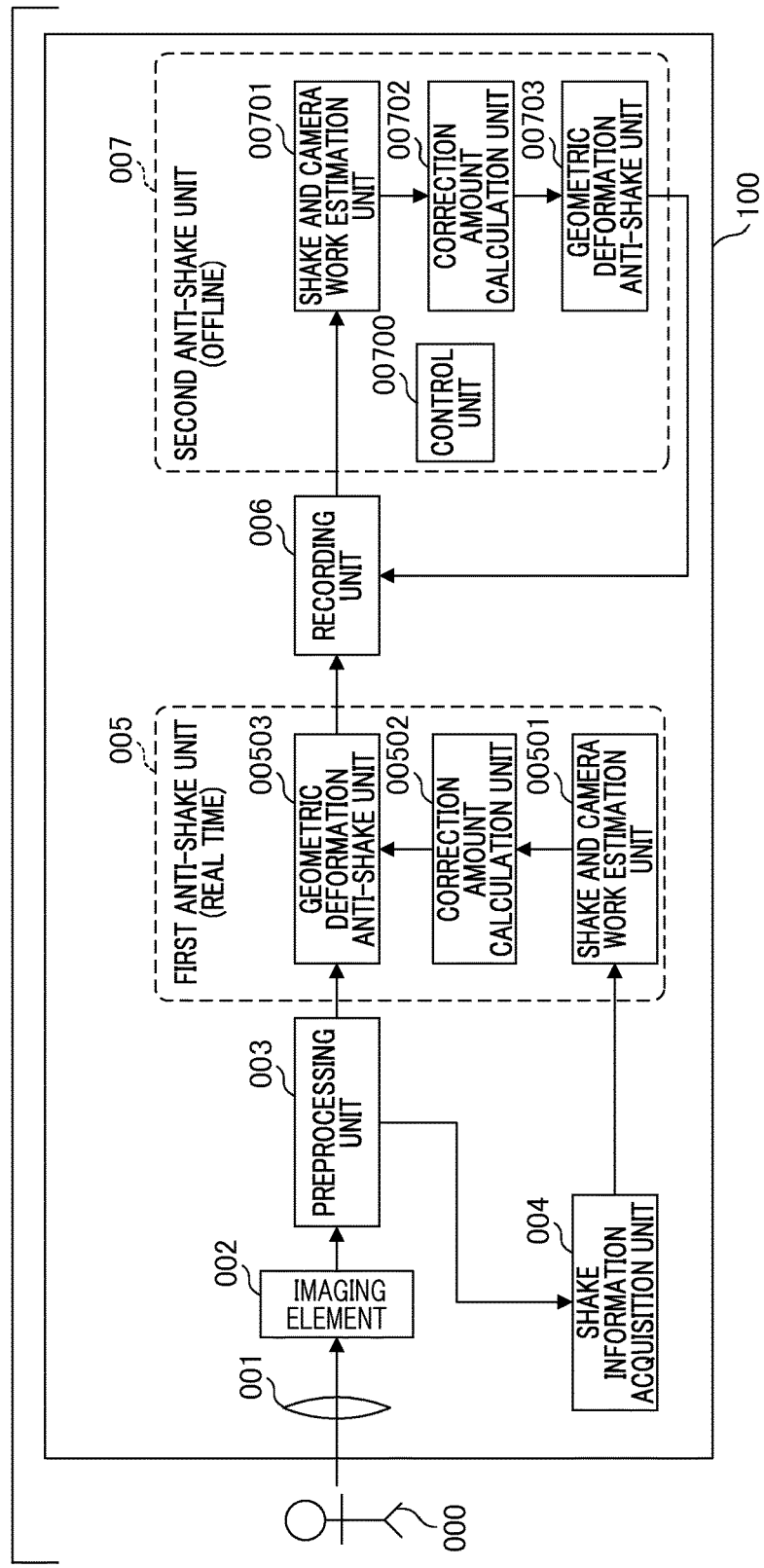
FIG. 1 is a diagram illustrating a device configuration example of Embodiment 1.

FIG. 1 is a diagram illustrating a device configuration example of Embodiment 1.

An image pickup apparatus 100 includes an optical system 001, an imaging element 002, a preprocessing unit 003, a shake information acquisition unit 004, a first anti-shake unit 005, a recording unit 006, and a second anti-shake unit 007. The present invention is applicable to a camera, a lens, and a camera and a lens integrated in an imaging apparatus.

The optical system 001 is a component that causes light of an object 000 to form an image on the imaging element 002, and includes a plurality of lenses and mirrors. The imaging element 002 is an element that converts an optical image formed on a sensor surface into an electronic image. The preprocessing unit 003 performs basic processing such as noise removal based on correlated double sampling (CDS), exposure control using gain-up in automatic gain control (AGC), black gradation level correction, and A/D conversion on an analog image signal subjected to photoelectric conversion in the imaging element 002. Accordingly, the preprocessing unit 003 obtains image data converted into a digital signal.

Color image generation or luminance image generation based on Bayer array interpolation, or the like, may be separately performed on an input image to be input to the shake information acquisition unit 004. Further, the image generation to be performed separately may be simple level processing for a vector search. Further, a filtering process such as low pass filtering or high pass filtering, and a gradation adjustment process such as tone mapping may be performed so as to improve precision or robustness of a motion vector detection process. Since the preprocessing unit 003 mainly executes preprocessing on an analog signal, a main unit is also referred to as an AFE (analog front end). On the other hand, a unit used in conjunction with a digital output sensor is referred to as a DFE (digital front end).

The shake information acquisition unit 004 acquires information regarding shaking of the image pickup apparatus, and outputs the information to the shake and camera work estimation unit 00501. The shake information acquisition unit 004 includes, for example, a posture sensor such as a multi-axis gyro sensor or an acceleration sensor, a geomagnetic sensor, and the like, to acquire the information regarding shaking of the image pickup apparatus. The posture sensor outputs a posture sensor signal indicating shaking of the image pickup apparatus. Further, the shake information acquisition unit 004 outputs the captured image from the preprocessing unit 003 to the shake and camera work estimation unit 00501.

The first anti-shake unit 005 executes an anti-shake process as a real-time process in the device for image data relating to a captured image (video). The first anti-shake unit 005 records image data after the anti-shake process on the recording unit 006. Further, the first anti-shake unit 005 outputs auxiliary information regarding content of the anti-shake process. The first anti-shake unit 005 includes a shake and camera work estimation unit 00501, a correction amount calculation unit 00502, and an image geometric deformation anti-shake unit 00503.

The shake and camera work estimation unit 00501 estimates or calculates shake/camera work in view of anti-shake based on the information regarding shaking of the image pickup apparatus obtained from the shake information acquisition unit 004 and the captured image from the preprocessing unit 003. In this example, the shake and camera work estimation unit 00501 estimates or calculates a geometric change (shake) of the captured image based on a motion vector detected from the captured image. Further, the shake and camera work estimation unit 00501 estimates or calculates the position and posture of the image pickup apparatus 100 as camera work.

The correction amount calculation unit 00502 calculates a component that is a correction target in the shake/camera work based on the shake/camera work output by the shake and camera work estimation unit 00501, and outputs the component as an amount of correction. This amount of correction is used to correct shake that occurs in the captured image.

The image geometric deformation anti-shake unit 00503 performs the anti-shake process by correcting the shake occurring in the captured image (executing a geometrical deformation anti-shake process) by geometrically deforming the captured image, based on the amount of correction calculated by the correction amount calculation unit 00502. The geometrical deformation anti-shake process, for example, suppresses shake of a moving image by deforming the input image frame through geometric deformation of the image called projective deformation, free deformation, or deformation of each area. The image geometric deformation anti-shake unit 00503 is realized by combining a calculation circuit configured of an electronic circuit, a control circuit for reading a signal from a sensor, a CPU, and a memory. Further, in a modification example of this embodiment, the image pickup apparatus may execute, as the first anti-shake process, an optical anti-shake process of correcting the shake occurring in the captured image by driving shake correction unit, such as a lens or an imaging element.

The recording unit 006 includes, for example, a semiconductor memory, and stores the image data captured and subjected to the anti-shake process. Further, a display unit configured as, for example, a liquid crystal display (not illustrated) displays the image data after the anti-shake process recorded on the recording unit 006 in real time.

The second anti-shake unit 007 performs re-anti-shake on the image data after the anti-shake process recorded on the recording unit 006 through offline processing later. The second anti-shake unit 007 includes a control unit 00700, a shake and camera work estimation unit 00701, a correction amount calculation unit 00702, and an image geometric deformation anti-shake unit 00703.

The control unit 00700 controls the shake and camera work estimation unit 00701, the correction amount calculation unit 00702, and the image geometric deformation anti-shake unit 00703 to execute the following process. The control unit 00700 performs re-anti-shake while executing a control process of removing influence of the anti-shake process performed by the first anti-shake unit (anti-shake influence removal process) on the image data after the anti-shake process within the recording unit 006 based on the auxiliary information output by the first anti-shake unit 005. The shake and camera work estimation unit 00701 estimates or calculates shake/camera work. The correction amount calculation unit 00702 calculates a component that is a correction target in the shake/camera work, and outputs the component as an amount of correction. The image geometric deformation anti-shake unit 00703 performs geometric deformation on the image based on the amount of correction calculated by the correction amount calculation unit 00702, to perform an anti-shake process.

In the second anti-shake unit 007, there is no restriction on real-time realization or on immediate display on the display unit. Therefore, for the shake and camera work estimation process or the geometrical deformation anti-shake process, it is possible to select various methods for increasing effects of the process. As a result, the second anti-shake unit 007 can execute the anti-shake process at a higher shake suppression rate than that in the first anti-shake unit 005.

Figure 2:
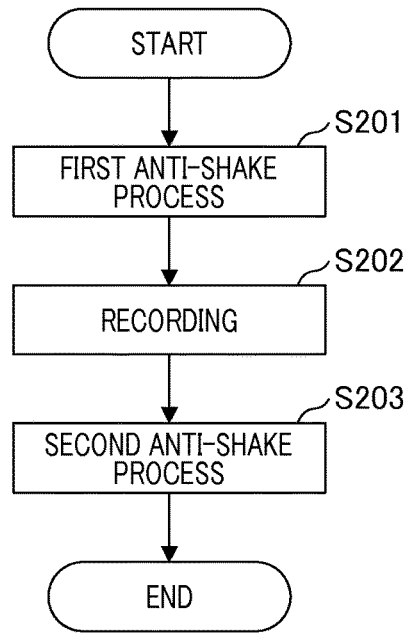
FIG. 2 is a flowchart illustrating an example of an anti-shake process in an image pickup apparatus.

FIG. 2 is a flowchart illustrating an example of the anti-shake process in the image pickup apparatus.

The first anti-shake unit 005 executes the first anti-shake process for the image data relating to the captured image output by the preprocessing unit 003 (step S201). The first anti-shake process is executed for the image data in real time. The first anti-shake unit 005 then records the image data after the first anti-shake process on the recording unit 006 (step S202). Also, the second anti-shake unit 007 executes the second anti-shake process for the image data recorded on the recording unit 006 (step S203).

Figure 3:
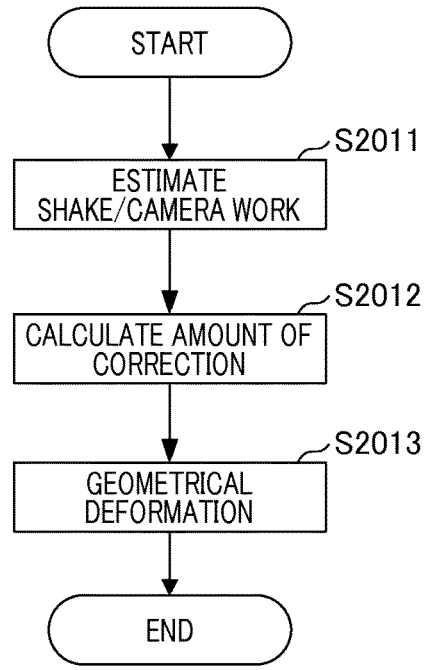
FIG. 3 is a flowchart illustrating an example of a first anti-shake process.

FIG. 3 is a flowchart illustrating an example of the first anti-shake process of step S201 in FIG. 2.

First, the shake and camera work estimation unit 00501 estimates the shake/camera work based on the information (posture sensor signal) regarding shaking of the image pickup apparatus output by the shake information acquisition unit 004 and the captured image from the preprocessing unit 003 (step S2011). The correction amount calculation unit 00502 then calculates an amount of correction (an amount of correction of the anti-shake) for correcting the shake of the captured image based on the estimated shake/camera work (step S2012). Also, the image geometric deformation anti-shake unit 00503 executes the geometrical deformation anti-shake process for the captured image based on the calculated amount of correction (step S2013).

First, the estimation of the camera work using the posture sensor signal will be described. The posture sensor includes, for example, a gyro sensor that detects a change in the position and posture of the image pickup apparatus on a maximum of three axes, and an acceleration sensor that detects a change in the position and posture of the image pickup apparatus on a maximum of three axes. A geomagnetic sensor, an inclination sensor, or the like, may be used in place of the posture sensor. In this example, the estimation of the position and orientation using the gyro sensor will be described.

The shake and camera work estimation unit 00501 converts a voltage value or a current value obtained at a sampling frequency $f_{s\_g}$ of the posture sensor, or sensor output information obtained as a digital value into an amount of change in an angle, and outputs the amount. For example, it is assumed that the shake information acquisition unit 004 is a gyro sensor having a digital output. The shake and camera work estimation unit 00501 obtains a correct angular velocity $rat_{x\_g}(i)$ at a time i by multiplying an output value $val_{x\_g}$ of a sensor attached in each coordinate axis direction by a correction gain gainx acquired by prior calibration. x indicates an axial direction of the sensor attached to each axis orthogonal to an optical axis of the optical system. x=Y,P,R indicates a yaw direction, a pitch direction, and a roll direction of the image pickup apparatus. _g indicates angular velocity information obtained based on a sampling frequency of the gyro.

$$rat_{x_g}(i) = gain_x \cdot val_{x_q}(i) \qquad (x=Y,P,R)$$

Also, the angular velocity can be considered to be a posture change of the camera expressed by a change in an angle in a short period of a sampling period $t_{s\_g}=1/f_{s\_g}$ of the sensor. However, since there is a large amount of information, integration is performed with information at a lower sampling frequency. For example, integration is performed at a sampling frequency $f_{s\_fr}$ for representing the posture change between the frames, an amount of information is compressed, and the information is sent. Specifically, $f_{s\_fr}$ has a value such as 60 Hz or 30 Hz. Hereafter, an arbitrary sampling frequency is assumed to be $f_{s\_y}(:f_{s\_fr}, \ldots)$. Through the integration based on Formula 1 below, conversion into an amount of posture change in the sampling period according to each process is performed, and exchange of the information is performed.

$$\Delta R_x \cong rat_{x\_y}(j) = \int_0^{n_{y\_g}-1} gain_x \cdot val(n_{y\_g}j + t)dt = \qquad \text{[Formula 1]}$$

$$\sum_{i=0}^{n_{y\_g}-1}(gain_x \cdot val(n_{y\_g}j+i) \cdot t_{s\_y})$$

However, it is assumed that $dt=t_{s\_y}$. ny_g is a magnification in the sampling period after integration viewed from a gyro sampling period. ratx_y(j) indicates an amount of posture change of a sampling purpose y and a time j with respect to an axis x (yaw, pitch, and roll). $t_{s\_y}$ indicates a sampling interval according to a purpose. However, $\Delta R_x$(x: Y, P, R) is hereafter assumed for simplification of description.

Further, Formula 1 can be considered to be an element that outputs the posture change in a unit time. Therefore, a process of removing a drift of an offset that is a special problem may be additionally performed for an angular velocity sensor that is a component so as to improve precision of an output value. Further, the speed change or the position change of the image pickup apparatus may be calculated by integrating a value obtained by subtracting influence of gravity from acceleration information obtained from an acceleration sensor attached in directions of a yaw axis, a pitch axis, and a roll axis of the image pickup apparatus. The position change at an obtained sampling interval can be similarly expressed as $\Delta t_x$(x: Y, P, R).

A technology for calculating a position and a posture, or a position and a posture change and, particularly, a posture of an object having an inertial sensor set including a gyro sensor or an acceleration sensor mounted thereon using the inertial sensor set is a general technology called strap-down AHARS.

Any existing technology as discussed in References 1 and 2 below may be used for additional signal processing for a posture sensor signal. For example, a configuration, in which a comparison process for posture change information is performed using output information from an acceleration sensor, removal of a drift that causes deterioration of precision is performed, and more accurate posture change information is output, may be adopted. For the same reason, the posture sensor may be an integrated multi-axis sensor of an assembly that is able to measure changes in postures of multiple axes at a time. To specify a gravity direction, vertical information obtained from geomagnetic information may be used, for example, when a premise that a yaw axis matches a vertical direction is satisfied in an initial posture of the image pickup apparatus may also be used.

Reference 1: "Strapdown Inertial Navigation Technology," D. Titteron, Peter Peregrinus, Ltd.

Reference 2: "An efficient orientation filter for inertial and inertial/magnetic sensor arrays," Technical Report, Department of Mechanical Engineering, University of Bristol, S. Madgwick, April 2010.

Reference 3: http://www.x-io.co.uk/gait-tracking-with-x-imu/, "Gait tracking with x-IMU"

Hereafter, estimation of shake of the captured image based on the motion vector in the shake and camera work estimation unit 00501 will be described. Template matching (TM) is used for estimation of shake of the captured image.

Figure 4:
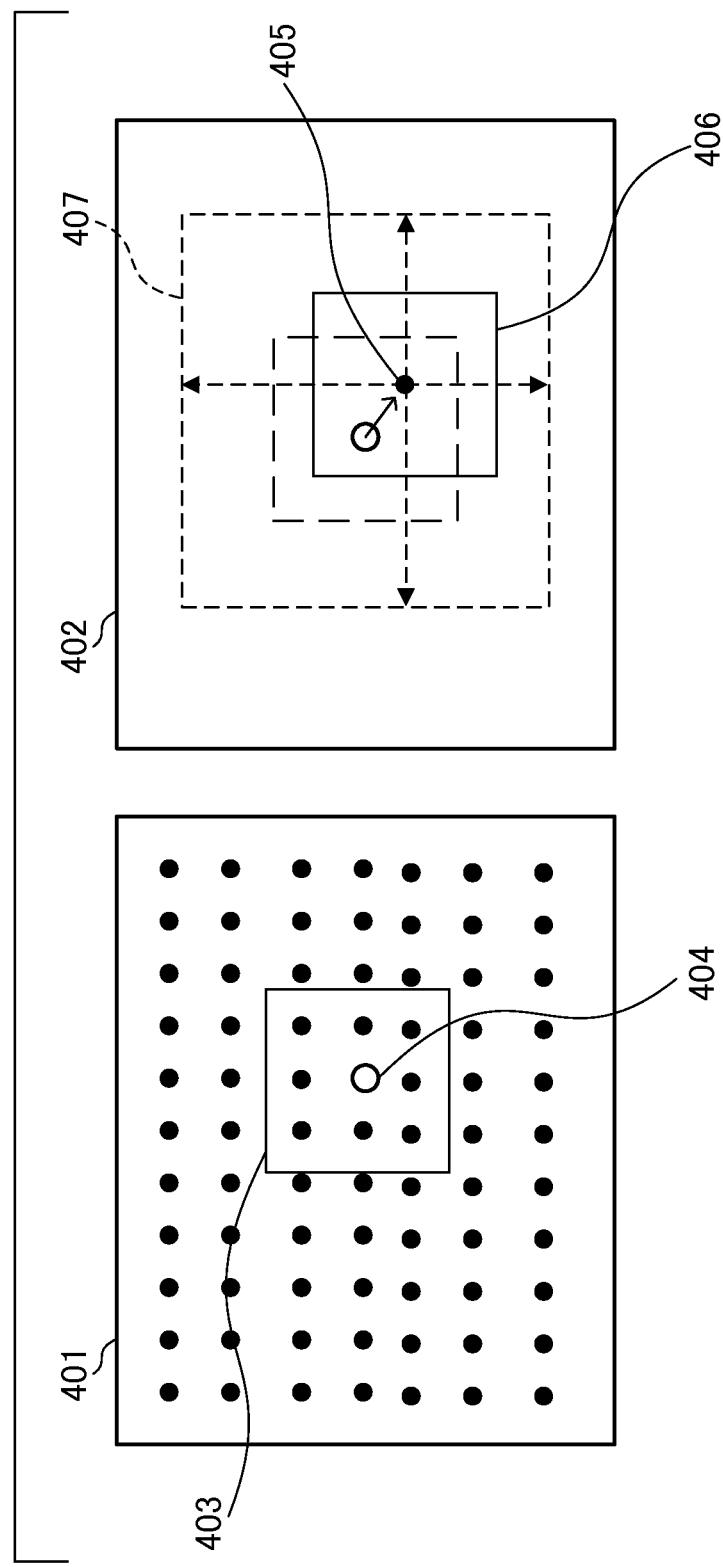
FIG. 4 is a diagram illustrating block matching.

FIG. 4 is a diagram illustrating block matching that is a type of TM.

In FIG. 4, it is assumed that a left image 401 is a criterion image and a right image 402 is a reference image. The shake and camera work estimation unit 00501 uses a first input current video frame as the criterion image and a subsequently input current video frame as a reference image to detect a motion vector. A partial area having a predetermined size around a point of interest 404, which is arranged in a grid form in the left image, is assumed to be a template 403. Any search range 407 is set in the reference image, and a position that the template most matches is searched for through sequential movement.

An input image may be a modulation image such as a color image, a luminance image, or a differential image. The shake and camera work estimation unit 00501 calculates a degree of similarity between a partial area 406 around an attention pixel 405 in the right image and the template 403 of the criterion image. A correlation operation such as SSD (Sum of Square Difference), SAD (Sum of Absolute Difference), or regular cross-correlation is used as a similarity degree index. When a luminance change between the frames is large as in a real video image, the regular cross-correlation is mainly used. A calculation formula of a similarity degree score of the regular cross-correlation is as follows.

$$R(x, y, x', y') = \frac{\sum_{i=-M_T}^{M_T} \sum_{j=-N_T}^{N_T} \{I_{(x,y)}(i,j) - \bar{I}\}\{I'_{(x',y')}(i,j) - \bar{I}'\}}{\sqrt{\sum_{i=-M_T}^{M_T} \sum_{j=-N_T}^{N_T} \{I_{(x,y)}(i,j) - \bar{I}\}^2} \sqrt{\sum_{i=-M_T}^{M_T} \sum_{j=-N_T}^{N_T} \{I'_{(x',y')}(i,j) - \bar{I}'\}^2}}$$

where $$\bar{I} = \frac{1}{M_T N_T} \sum_{i=-M_T}^{M_T} \sum_{j=-N_T}^{N_T} I_{(x,y)}(i,j),$$

$$\bar{I}' = \frac{1}{M_T N_T} \sum_{i=-M_T}^{M_T} \sum_{j=-N_T}^{N_T} I'_{(x',y')}(i,j)$$

and (x, y) and (x', y') indicate positions of the templates in the criterion image I and the reference image I'. $I_{(x,y)}(i, j)$ and $I'_{(x',y')}(i, j)$ indicate the partial images.

As a result of calculating all degrees of similarity of each partial area 406 of each point of interest 405 in the search range, the shake and camera work estimation unit 00501 regards a position having a high degree of similarity (for example, correlation score) as a corresponding position to calculate a motion vector. When there is no occlusion, motion vectors are basically calculated according to the number of points of interest 404 set on the criterion image. The motion vector is expressed as a vector having a point of interest position in the criterion image as a start point and a corresponding point position in the reference image as an end point.

$(x,y,x',y')_i, i=, \ldots ,m$ ($m$: Number of Motion Vectors)

Further, a peak position of the degree of similarity may be calculated with higher precision by performing multinomial fitting on the correlation score within a search area, or a trajectory of the motion vector or the corresponding point may be calculated with subpixel precision, for example, through a process of causing the template and the reference image to higher pixel counts.

While the example of the block matching in which points of interest are fixedly arranged in a grid form has been shown above, a feature point at which the motion vector is easily calculated may be extracted on the criterion image, and a vector search may be performed using a position of the feature point as the point of interest. An image processing filter, such as a Harris operator (Reference 1), is usually used for extraction of the point of interest. By extracting a corner position of the image as the feature point, a problem of an opening or a problem of "slip" caused by performing search at a position having no particular characteristics is suppressed, and a search rate can be improved or a reduction of an outlier rate and improvement of precision can be expected.

The Harris operator first determines a window size W, and calculates a differential image (Idx, Idy) in a horizontal direction and a vertical direction. A Sobel filter, or the like, may be used for calculation of the differential image. For example, for the filter, h is set in a horizontal direction and three 3×3 filters $h_x$ arranged in a vertical direction are applied to the image, and then h is set in a vertical direction and three 3×3 filters $h_y$ arranged in the horizontal direction are applied to the image so as to obtain ($I_{dx}$, $I_{dy}$).

$$h = \lfloor 1, \sqrt{2}, 1 \rfloor / (2+\sqrt{2})$$

Also, the shake and camera work estimation unit 00501 calculates the following matrix using a window W for all coordinates (x, y) in the image.

$$G = \begin{bmatrix} \sum_W I_x^2 & \sum_W I_x I_x \\ \sum_W I_x I_x & \sum_W I_y^2 \end{bmatrix}$$

The shake and camera work estimation unit 00501 extracts feature points in order of coordinates (x, y) at which a minimum singular value of a matrix G is great. In this case, it is preferable for the feature points not to be too dense. Therefore, a condition that the feature points no longer be calculated in the periphery of the window size W at the coordinates (x, y) at which the feature points have already been extracted may be provided. References include Reference 4 below.

Reference 4: "A combined corner and edge detector," C. Harris and M. Stephens, Fourth Alvey Vision Conference, pp. 147-151, 1988.

Between continuous frames, the shake and camera work estimation unit 00501 may obtain the feature point again to perform TM or may perform TM between new frames using an end of an obtained motion vector as a point of interest and track a trajectory of the feature point. Further, the shake and camera work estimation unit 00501 may perform table matching between the feature points calculated in each frame using a feature value as key information and perform association. For example, by utilizing a pruning algorithm, redundant association work can be reduced, and thus, efficient association is possible.

Then, the shake and camera work estimation unit 00501 converts a corresponding point within each frame constituting the motion vector from a corresponding point value of a pixel coordinate system of each input frame to a corresponding point value in a normalization image coordinate system for the purpose of improvement of calculation precision or stabilization of the calculation. Hereafter, (x, y) are pixel coordinates in the input frame, $(u_d, v_d)$ are coordinates of a normalized image with distortion, and (u, v) are coordinates of a normalized image from which the distortion has been removed. The shake and camera work estimation unit 00501 performs the conversion using an internal parameter and a distortion coefficient. First, the shake and camera work estimation unit 00501 performs the conversion into normalized image coordinates using the internal parameter. Inv( ) indicates an inverse matrix of the matrix of ( ).

$$\begin{bmatrix} u_d \\ v_d \\ 1 \end{bmatrix} = inv\left(\begin{bmatrix} f_{c\_new}k_u & 0 & u_0 \\ 0 & f_{c\_new}k_v & v_0 \\ 0 & 0 & 1 \end{bmatrix}\right)\begin{bmatrix} x \\ y \\ 1 \end{bmatrix}$$

A matrix of the internal parameter is called a camera matrix K.

$$K = \begin{bmatrix} f_{c\_new}k_u & 0 & u_0 \\ 0 & f_{c\_new}k_v & v_0 \\ 0 & 0 & 1 \end{bmatrix}$$

Also, the shake and camera work estimation unit 00501 removes the distortion using a distortion coefficient.

$$\begin{bmatrix} u_d \\ v_d \end{bmatrix} \rightarrow \begin{bmatrix} u \\ v \end{bmatrix} \quad \text{[Formula 2]}$$

The operation of Formula 2 described above is realized through a process to be described below. The distortion removal is performed using a radial distortion relationship:

$$K = 1 + k_1 r + k_2 r^2 + k_3 r^3 + \ldots, \quad r^2 = u_d^2 + v_d^2$$

$$u = u_d/K, v = v_d/K$$

k1, k2, and k3 indicate first, second, and third distortion coefficients in a radiation direction, respectively. These are distortions caused by aberration of the optical system. The distortion varies with photography conditions such as a focus distance of the optical system or an object distance. Therefore, a relationship with the focus distance, or the like, is calculated from a design value. Also, this is stored in a ROM (not illustrated), or the like, as a look-up table corresponding to a focus distance, or the like, or a conversion equation regarding the focus distance, or the like, and a CPU (not illustrated) reads the look-up table or the conversion equation based on photography conditions. In this embodiment, while only the distortion in a radiation direction is removed, a distortion removal process may be separately added and performed if other distortions such as distortion in a radius direction are remarkable.

Also, the shake and camera work estimation unit 00501 receives a compensated corresponding point between a current frame and a past frame, and estimates, for example, an image change between the frames as shake. The image change is, for example, a parameter for a geometric change of the image expressed as a model in a hierarchical form of projective deformation, Euclidean deformation, affine deformation, and the like.

Reference 5: R. Hartley, "Multiple View Geometry in computer vision," Cambridge Press, pp. 25-44, 2003.

Hereafter, estimation of the image change based on projective homography will be described. When the normalized image coordinates in the past frame are $(u_i, v_i)$ and the normalized image coordinates in the current frame are $(u_i', v_i')$, I=1, ..., m (m is the number of corresponding points), a linear formula for the projective homography can be obtained.

$$\begin{bmatrix} 0 & 0 & 0 & -u_i & -v_i & -1 & v_i'u_i & v_i'v_i & v_i' \\ u_i & v_i & 1 & 0 & 0 & 0 & -u_i'u_i & -u_i'v_i & -u_i' \\ \vdots & \vdots & \vdots & \vdots & \vdots & \vdots & \vdots & \vdots & \vdots \\ 0 & 0 & 0 & -u_m & -v_m & -1 & v_m'u_m & v_m'v_m & v_m' \\ u_m & v_m & 1 & 0 & 0 & 0 & -u_m'u_m & -u_m'v_m & -u_m' \end{bmatrix}\begin{bmatrix} h_{11} \\ h_{12} \\ h_{13} \\ h_{21} \\ h_{22} \\ h_{23} \\ h_{31} \\ h_{32} \\ h_{33} \end{bmatrix} = 0$$

This linear formula results in over-determination if the number of corresponding points m≥8. Also, h={$h_{11}$, ..., $h_{33}$} is obtained by solving a linear least square equation. By shaping this into the following 3×3 matrix, the projective homography, that is, an amount of change of the image between the frames, is obtained.

$$H = \begin{bmatrix} h_{11} & h_{12} & h_{13} \\ h_{21} & h_{22} & h_{23} \\ h_{31} & h_{32} & h_{33} \end{bmatrix}$$

Further, in the shake and camera work estimation process, the shake and camera work estimation unit 00501 may receive the captured image from the preprocessing unit 003, and estimate camera work. Specifically, the shake and camera work estimation unit 00501 calculates a change in the position and posture of the image pickup apparatus between a timing of the current frame and a timing of the past frame, as in a case in which the posture sensor signal is used. The shake and camera work estimation unit 00501 basically executes posture estimation based on decomposition of a basic matrix or a posture estimation method based on a pinhole camera model such as a five-point method, for corresponding point information converted into a value in a normalized image coordinate system, to estimate the camera work. Generally, calculation in the posture estimation based on the decomposition of the basic matrix is simpler. However, in the corresponding point calculation, when a spatial arrangement in which a calculation position has been mapped is a specific arrangement, such as on a plane, a solution is not obtained due to degeneration in the estimating method based on the decomposition of the basic matrix. In this case, a method of obtaining the projective homography obtained above and estimating the position and posture of the image pickup apparatus through a decomposition operation is applied.

Figure 5:
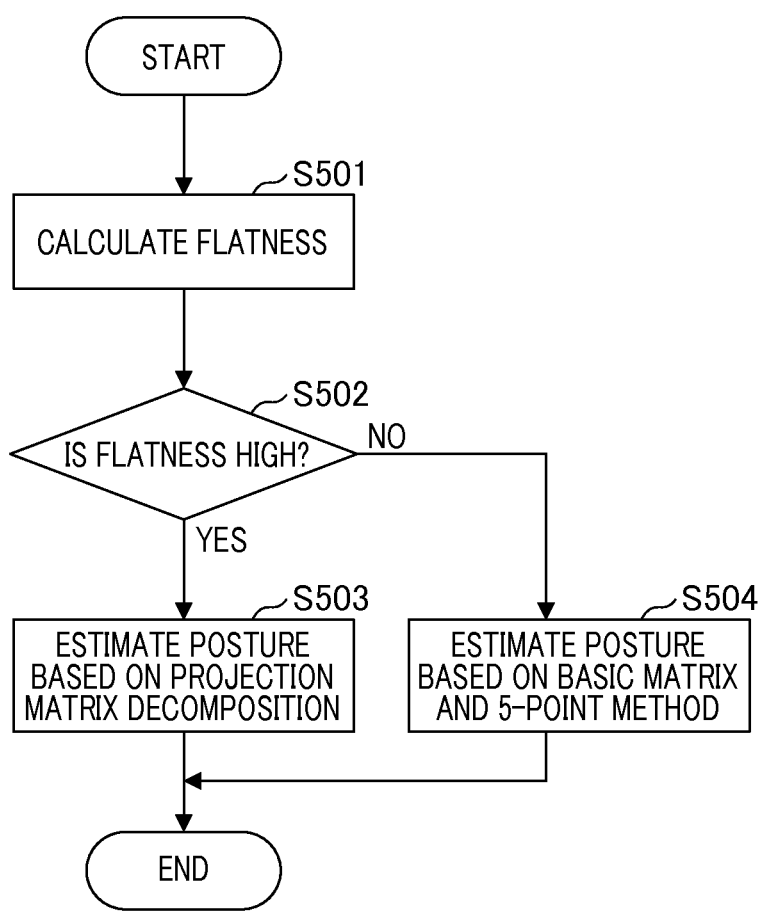
FIG. 5 is a flowchart illustrating an example of a process of estimating camera posture.

FIG. 5 is a flowchart illustrating an example of a process of estimating a position and posture of the image pickup apparatus.

The shake and camera work estimation unit 00501 calculates flatness (step S501). The flatness is determined by the number of conditions of a data matrix calculated from the corresponding point. First, the shake and camera work estimation unit 00501 decomposes the projective homography into the camera work rotation R, a direction $\vec{n}$ of a surface in which an object of a scene is approximated, and a product $\vec{t}/d$ of the translation $\vec{t}$ and a depth d. Further, hereafter, a right arrow affixed to the upper right or above a parameter denotes a vector.

The shake and camera work estimation unit 00501 determines whether the flatness is higher than a predetermined value (step S502). When the flatness is higher than the predetermined value, the shake and camera work estimation unit 00501 performs the estimation of the position and posture based on projection matrix (projective homography) decomposition (step S503). When the flatness is not higher than the predetermined value, the shake and camera work estimation unit 00501 performs the estimation of the position and posture based on a basic matrix and the five-point method (step S504).

The estimation of the position and posture based on the projective homography decomposition will be described. The shake and camera work estimation unit 00501 calculates two possible solutions using the following procedure. The decomposition into two solutions of the projective homography (projection matrix) is performed by finding invariants using eigenvalue decomposition and singular value decomposition. While various solutions are possible, the approach used in Reference 6 is applied in this example.

Reference 6: B. Triggs, "Auto calibration from Planar Scene," ECCV98.

A relationship among the projective homography, the camera work, and a scene arrangement is expressed as a formula below.

$$H = \lambda \left( R + \frac{1}{d}\vec{n}\vec{t}^T \right)$$

R and $\vec{t}$ denote the rotation and the translation of the camera, d denotes a distance to a reference surface, $\vec{n}$ denotes a normal in a direction away from the camera of the reference surface, and X, denotes an arbitrary constant. Here, in calculation from two images, a product of the distance d of the space plane and the norm norm($\vec{t}$) of the camera work translation cannot be decomposed. The norm is an amount indicating a size of the vector. That is, $\vec{t}$ is treated as a unit direction vector norm($\vec{t}$)=1 indicating a translation direction, and d is treated as a product of the distance to the space plane and the amount of translation.

Initially, a sign of H is selected to satisfy $x_{2\rightarrow}\rightarrow TH_{x1}\rightarrow$ at all corresponding points $x_1\rightarrow$ and $x_2\rightarrow$ on the plane. Singular value decomposition of H becomes $H=USV^T$. Here, U and V are 3×3 rotation matrixes. $S=\text{diag}(\sigma_1, \sigma_2, \sigma_3)$ is a positive descending diagonal element $\sigma1 \geq \sigma2 \geq \sigma3$, and is assumed to be the singular value of H. Column elements of related orthogonal matrixes U and V are expressed as $u_1, u_2, u_3$ and $v_1, v_2, v_3$.

A reference system of the first camera is adopted and a three-dimensional plane is assumed to be $\vec{n}^T\vec{x}=d=1/\xi$. Here, $\vec{n}$ is assumed to be a normal in an outward direction (a direction away from the camera). $\xi=1/d\geq 0$ is a reciprocal of a distance with respect to the plane. In this reference system, the first camera has a 3×4 projection matrix below.

$$P_1=[I_{3\times 3}|\vec{0}]$$

Also, the second camera has the following matrix:

$$P_2=R[I_{3\times 3}|t]=[R|t']$$

Here, t'=Rt, t,t' indicates translation between the cameras (translation from an optical axis center of a first camera to an optical axis center of a second camera), and R indicates rotation between the cameras.

The homography from image 1 to image 2 is $H=RH_1$. Here, $$H_1=I_{3\times 3}-\zeta\vec{t}\vec{n}^T$$

For a three-dimensional point on the plane, $$H\vec{x}=R(\vec{x}-\zeta\vec{t}\vec{n}^T\vec{x})=R(\vec{x}-\vec{t})\approx P_2\vec{x}$$

This is because $\xi nTx\rightarrow =1$. Also, when $x\rightarrow$ is treated as an arbitrary point in image 1, a difference is only an entire scale factor.

Only a product $\xi t\rightarrow n\rightarrow T$ can be restored, and therefore is normalized $$\|t\|=\|n\|=1$$

That is, a plane distance $1/\xi$ is measured at a unit baseline length $\|t\|$. Also, a depth positive constraint test is performed to determine a possible sign.

$H=USV^T$ and $H_1=U_1SV^T$ of the singular value decomposition are the same to the elements of R. That is, $U=RU_1$. In H1, a cross product vector $t\rightarrow \times n\rightarrow$ is invariant. If the singular value is clear, $t\rightarrow \times n\rightarrow$ should correspond to the singular vector. Accordingly, it is seen that this is always a second singular vector $v_2$. Therefore, correction normalization of H is $H\rightarrow H/\sigma 2$, that is, $(\sigma_1, \sigma_2, \sigma_3)\rightarrow(\sigma_1/\sigma_2, 1, \sigma_3/\sigma_2)$. Hereafter, it is assumed that normalization by $G_2$ is completed.

If $t\rightarrow xn\rightarrow$ corresponds to $v_2$ in image frame 1, a $\{t\rightarrow, n\rightarrow\}$ partial space must be occupied by $\{v_1, v_3\}$, that is, for arbitrary parameters $\alpha$ and $\beta$ ($\alpha 2+\beta 2=1$), $$\vec{n}=\beta\vec{v}_1-\alpha\vec{v}_3, \vec{n}\times(\vec{t}\times\vec{n})\approx\alpha\vec{v}_3+\beta\vec{v}_3$$

An arbitrary direction orthogonal to n- and, particularly, $\vec{n}\times(\vec{t}\times\vec{n})$ has a norm that is not changed by H or $H_1$.

$$(\alpha\sigma_1)^2+(\beta\sigma_3)^2=\alpha^2+\beta^2$$

or $$(\alpha,\beta)=(\pm\sqrt{1-\sigma_3^2},\pm\sigma_1^2-1)$$

When $t\rightarrow xn\rightarrow$ is associated with $v_1$ or $v_3$ described above, a solution disappears. Therefore, only $v_2$ becomes possible. Strictly, the same argument of a left side indicates:

$$R\vec{t}=-(\beta u_1+\alpha u_3)$$

If $\vec{t}$ satisfies an eigenvector of an eigenvalue $1-\xi \vec{n}\vec{t}^T$ of $H_1$, $$H\vec{t}=(1-\zeta\vec{n}^T\vec{t})R\vec{t}$$

is obtained.

Therefore, $$t \approx H^{-1}(R\vec{t}) \approx \beta/\sigma_1 \vec{v}_1 + \alpha/\sigma_3 \vec{v}_3$$

Further, $\xi=\sigma_1-\sigma_3$ after simplification.

A left side (column U1; $U_{1\to}$, $u_{2\to}$, $u_{3\to}$) of a singular value decomposition of $H_1$ can be restored by a notation $u_{2\to}=v_{2\to}$, and it is necessary for $\vec{t}$ to be an eigenvector of $H_1$. Here, $$\vec{u}_1=\gamma\vec{v}_1+\delta\vec{v}_3, \vec{u}_3=\delta\vec{v}_1-\gamma\vec{v}_3$$

Here, after simplification, $$(\gamma,\delta)\approx(1+\sigma_1\sigma_3,\pm\alpha\beta)$$

Therefore, $$R = UU_1^T = U\begin{bmatrix} \gamma & 0 & \delta \\ 0 & 1 & 0 \\ -\delta & 0 & \gamma \end{bmatrix}V^T$$

and finally, rotation R is obtained.

Hereafter, a series of specific processes for calculating two possible solutions of the camera work including the rotation and the translation, and the scene arrangement including R, $\vec{t}$ (directional vector), a depth position d and a direction $\vec{n}$ of the reference surface of the space are collectively shown.

$$[U, S, V] = svd(H) \quad \text{[Formula 3]}$$
$$\sigma_1' = \sigma_1/\sigma_2, \sigma_3' = \sigma_3/\sigma_2$$

However, $$S = \begin{bmatrix} \sigma_1 & 0 & 0 \\ 0 & \sigma_2 & 0 \\ 0 & 0 & \sigma_3 \end{bmatrix}, \sigma_1 \geq \sigma_2 \geq \sigma_3 \geq 0$$

$$\zeta = (1/d) = \sigma_1' = \sigma_3'$$

$$a_1 = \sqrt{1-\sigma_3'^2}, b_1 = \sqrt{\sigma_1'^2-1}$$

$$a = a_1 / \sqrt{a_1^2+b_1^2}, b = b_1 / \sqrt{a_1^2+b_1^2}$$

$$c = (1+\sigma_1'\sigma_3') / \sqrt{(1+\sigma_1'\sigma_3')^2+(a_1b_1)^2},$$

$$d = (a_1b_1) / \sqrt{(1+\sigma_1'\sigma_3')^2+(a_1b_1)^2}$$

$$e = (-b/\sigma_1') / \sqrt{(-b/\sigma_1')^2+(-a/\sigma_3')^2},$$

$$f = (-a/\sigma_3') / \sqrt{(-b/\sigma_1')^2+(-a/\sigma_3')^2}$$

$$\vec{v}_1 = V(:,1), \vec{v}_3 = V(:,3)$$
$$\vec{u}_1 = U(:,1), \vec{u}_3 = U(:,3)$$

Using these, the two possible solutions:

$$\{R_1, \vec{t}_1, \vec{n}_1\}, \{R_2, \vec{t}_2, \vec{n}_2\}$$

are obtained.

$$\vec{n}_1 = b\vec{v}_1 - a\vec{v}_3, \vec{n}_2 = b\vec{v}_1 + a\vec{v}_3$$

$$R_1 = U\begin{bmatrix} c & 0 & d \\ 0 & 1 & 0 \\ -d & 0 & c \end{bmatrix}V^T, R_2 = U\begin{bmatrix} c & 0 & -d \\ 0 & 1 & 0 \\ d & 0 & c \end{bmatrix}V^T$$

$$\vec{t}_1 = -(b\vec{u}_1 + a\vec{u}_3), \vec{t}_2 = -(b\vec{u}_1 - a\vec{u}_3), \text{ (Here, } P_2 = [R \mid t])$$

A condition (depth positive restriction) that the directional vector $\vec{n}$ be outward is introduced to the set of solutions.

$$\text{if}(\vec{n}_1(3)<0)\vec{t}_1=-\vec{t}_1,\vec{n}_1=-\vec{n}_1$$

$$\text{if}(\vec{n}_2(3)<0)\vec{t}_2=-\vec{t}_2,\vec{n}_2=-\vec{n}_2$$

The two possible solutions are calculated by taking the consistency of a sign. Then, an epipolar error check is performed, and one solution with a smaller error is extracted. The epipolar error check is executed as follows. The epipolar error is calculated using the corresponding points for the set of two possible solutions of the posture change and scene information obtained by decomposing the homography obtained from corresponding points $x_{1\to}$ and $x_{2\to}$:

$$\{R_1, \vec{t}_1/d, \vec{n}_1\}, \{R_2, \vec{t}_2/d, \vec{n}_2\}$$

The epipolar error is expressed as:

$$e_i = \sum_j^n \left(\vec{x}_2^{jT}([\vec{t}_i]_\times R_i)\vec{x}_1^j\right), i=1,2, j=1,2,\ldots,n$$

n is the number of corresponding points. The solution having a smaller error is selected as a true solution. Accordingly, a unique solution of $\{R, \vec{t}, \vec{n}, d\}$ indicating the camera work between the input frames is obtained.

Further, the estimation of a position and posture based on a basic matrix and a five-point method, which is a method of estimating a posture of a camera for a non-plane scene in which a pinhole camera model is assumed, can be realized based on well-known technologies described in References 7 and 8.

Reference 7: "Multiple View Geometry in Computer Vision," R. Hartley and A. Zisserman, Cambridge Univ. Press (2000)

Reference 8: "Routines for Relative Pose of Two Calibrated Cameras from 5 Points," Bill Triggs, Documentation, INRIA. juillet 2000.

A method of performing the estimation using only information regarding photography conditions and the input vector was applied above in the estimation of the change in the position and orientation of the image pickup apparatus, and specifically, amounts of rotation and translation. Further, using information regarding rotation between the frames of the image pickup apparatus obtained from the integration of the gyro sensor value as the information regarding the rotation of Formula 3, the correction (cancellation) of the image change for the rotation of the image pickup apparatus with respect to a change in the motion vector between the frames, that is, a change in the corresponding point, may first be performed. Also, the amount of translation of the image pickup apparatus in a state in which there is no translation sensor information may be estimated by applying fitting.

Further, using the information regarding rotation between the frames of the image pickup apparatus obtained from the integration of the gyro sensor value as an initial value of the rotation of Formula 3, fitting is applied to the change in the motion vector (the change in the corresponding point) between the frames. Also, accurate rotation information of the image pickup apparatus may be estimated, in addition to the amount of translation in the state in which there is no sensor information (Reference 3).

Similarly, the following estimation process may be executed. That is, the information regarding rotation between the frames of the image pickup apparatus obtained from the integration of the gyro sensor value is used as the initial value of the rotation of Formula 3. Also, using an amount of translation between the frames of the image pickup apparatus obtained from the integration of an acceleration sensor value as an initial value of the amount of translation of Formula 3, fitting is applied to the change in the motion vector between the frames, that is, to the change in the corresponding point. Accordingly, accurate estimation over the sensor performance for the amounts of the rotation and the translation of the image pickup apparatus can be realized.

Next, the correction amount calculation process (S2012) in FIG. 3 will be described.

The correction amount calculation unit 00502 calculates an amount of correction of the anti-shake based on the estimated shake/camera work. For example, when the input is an image change expressed as projective deformation, each amount of image change between frames is used as the input. Also, using a sequence including a sequence calculated between past frames of the amount of image change:

$$H^{n-k+1}, H^{n-k+2}, \ldots, H^n$$

the amount of correction of the anti-shake for a target frame is calculated. Here, n is a current frame number, and k is the number of elements of the sequence. The first anti-shake unit 005 regards a motion component having a high frequency as a component to be subjected to the anti-shake, performs anti-shake correction to remove the component from a video sequence, regards a motion component having a low frequency as an intended motion component, and stores the intended motion component in the video. Using filtering, separation of these signal components is performed. The filtering is realized by digital filtering. The number of elements of the input sequence is associated with the number of taps of the digital filter.

Figure 6:
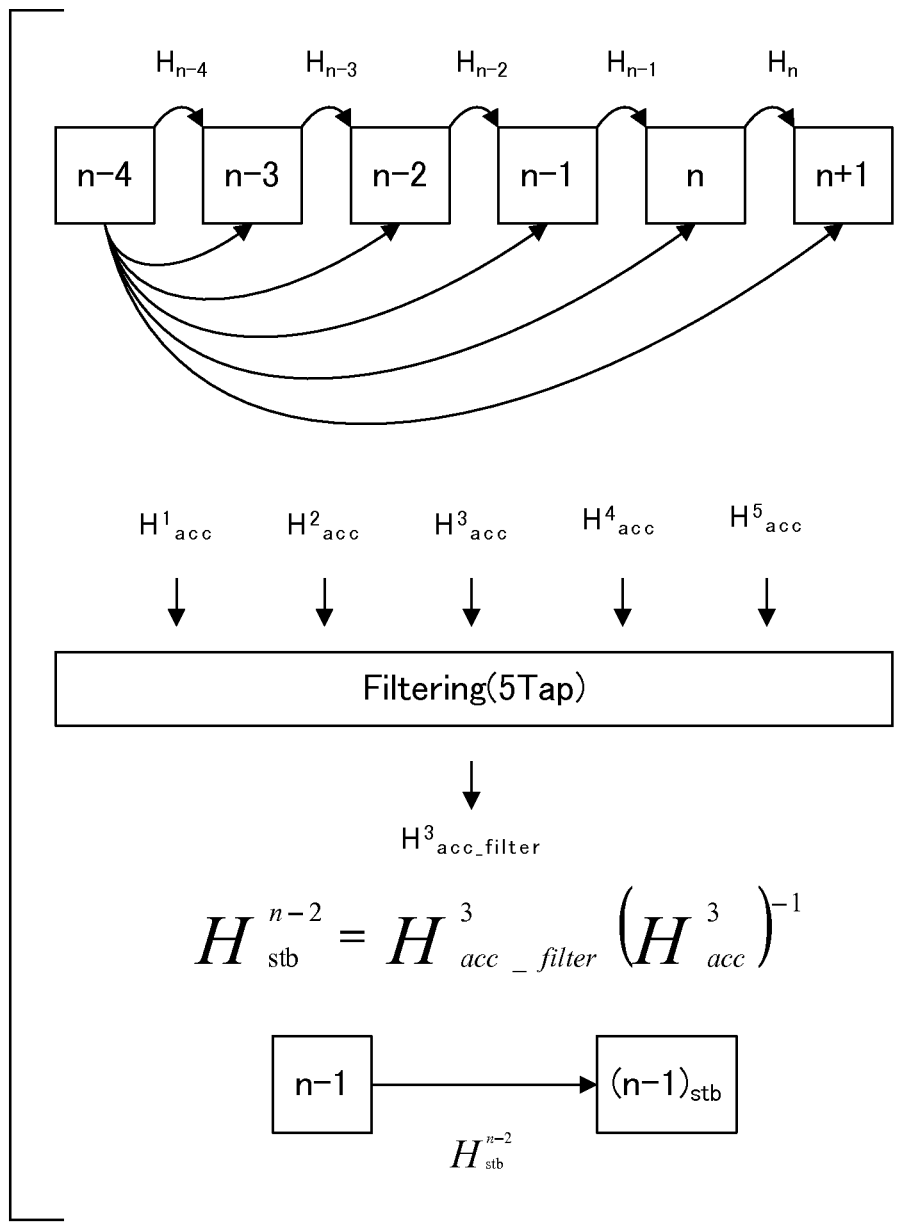
FIG. 6 is a diagram illustrating an example of a process of calculating an amount of correction of anti-shake.

FIG. 6 is a diagram illustrating an example of a process of calculating the amount of correction of the anti-shake using the digital filtering.

As an example of the digital filter, an FIR filter with five taps is applied. An amount of image change among five frames is necessary for calculation of the amount of correction of the anti-shake for one frame.

Figure 7:
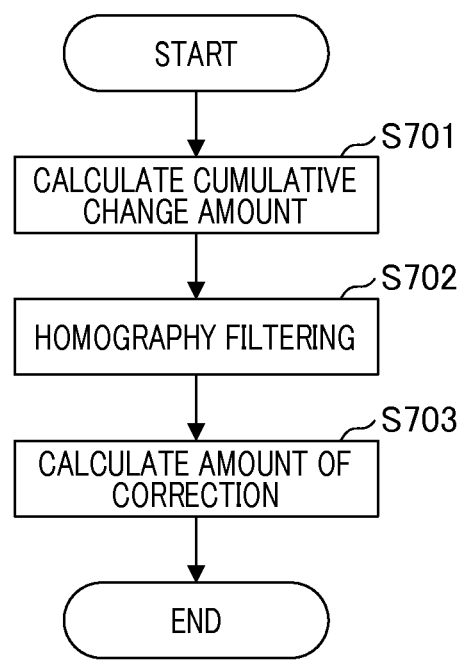
FIG. 7 is a flowchart illustrating an example of a process of calculating an amount of correction of anti-shake.

FIG. 7 is a flowchart illustrating the process of calculating the amount of correction of the anti-shake.

First, the correction amount calculation unit 00502 calculates a cumulative amount of change:

$$H_{acc}^1, H_{acc}^2, \ldots, H_{acc}^5$$

based on a beginning of an input sequence from amounts of image change calculated between current frames and between past frames (step S701).

Here, $$H_{acc}^1 = H^{n-k+1} \ldots + H^{nk+2} H^{n\ k-1} (\text{Where } i \leq k)$$

Therefore, in this example, $$H_{acc}^3 = H^{n-2} H^{n-2} H^{n-3} H^{n-4}$$

Then, the correction amount calculation unit 00502 performs homography filtering (step S702). That is, the correction amount calculation unit 00502 performs filtering on a sequence of cumulative change amount homography. A combination with a Fourier series method or a window function method is used to design the digital filter and determine a coefficient of the digital filter. The correction amount calculation unit 00502 determines characteristics such as a transition region and the number of taps to calculate the coefficient of the digital filter. A cumulative change amount sequence according to the number of taps (TAP=5) of the digital filter $$(H_{acc}^1, H_{acc}^2, \ldots, H_{acc}^5)$$

is input, and digital filtering is performed. As a result, the following filtering result H3acc_filter affected by delay is output.

When the digital filter is an FIR filter, an amount of delay is proportional to the number of taps.

$$\text{Amount of Delay} = \frac{(TAP-1)}{2}$$

Therefore, in the case of a digital filter with five taps, a delay corresponding to two frames occurs. Therefore, using the amount of image change from the current frame to a frame four frames earlier:

$$(H^{n-4} \ldots, H^n)$$

the correction amount calculation unit 00502 calculates the cumulative amount of change:

$$(H_{acc}^1, H_{acc}^2, \ldots, H_{acc}^5)$$

and a result of digital filtering corresponds to the cumulative change amount H3acc before two frames from the current frame.

Then, the correction amount calculation unit 00502 calculates an amount of anti-shake correction using the amount of image change $H^i_{acc\_}$ filter restored from a filtering result and the cumulative amount of change $H^i_{acc}$ of the amount of image change between the target frames that correspond to each other as a result of delay (step S703). When the digital filter is a low pass filter, an amount of correction of the anti-shake of the target frame is obtained by calculating:

$$H_{stb}^{n-(k-1)/2} = H_{acc\_filter}^{k-(k-1)/2} H_{acc}^{k-(k-)/2}$$

k is the number of taps of the digital filter.

When the number of taps is five, the amount of correction of the anti-shake corresponding to a frame before two frames from the current frame is calculated using:

$$H_{stb}^{n-2} = H_{acc\_filter}(H_{acc}^3)^{-1}$$

In this embodiment, when an (n+1)$^{th}$ frame is assumed to be a current frame, an (n−1)$^{th}$ frame is a frame to be subjected to the anti-shake process.

Through the procedure described above, the amount of correction of the anti-shake for the corresponding frame is calculated. However, for digital filtering, it is usually assumed that a one-dimensional signal having only a time axis is an input signal. Therefore, it is necessary for a homography sequence, which is a multidimensional amount to be converted (component-separated) into a set of a plurality of one-dimensional amount sequences, such as the following sequences, prior to a filtering step.

$$a_1^1, a_1^2, \ldots a_1^i$$

$$a_2^1, a_2^2, \ldots a_2^i$$

In this embodiment, the following projective homography which is the amount of image change between the frames is converted into a set of one-dimensional amount sequences separated into a component similar to the camera work.

$$H_{acc}^i = \begin{bmatrix} h_1 & h_2 & h_3 \\ h_4 & h_5 & h_6 \\ h_7 & h_8 & h_9 \end{bmatrix} (i = 1, \ldots, k)$$

Also, digital filtering is performed. Then, a set of one-dimensional amounts after the filtering is subjected to inverse conversion so as to obtain projective homography after filtering below.

$$H_{acc\_filter}^{k-(k-1)/2} = \begin{bmatrix} h_1' & h_2' & h_3' \\ h_4' & h_5' & h_6' \\ h_7' & h_8' & h_9' \end{bmatrix}$$

Figure 8:
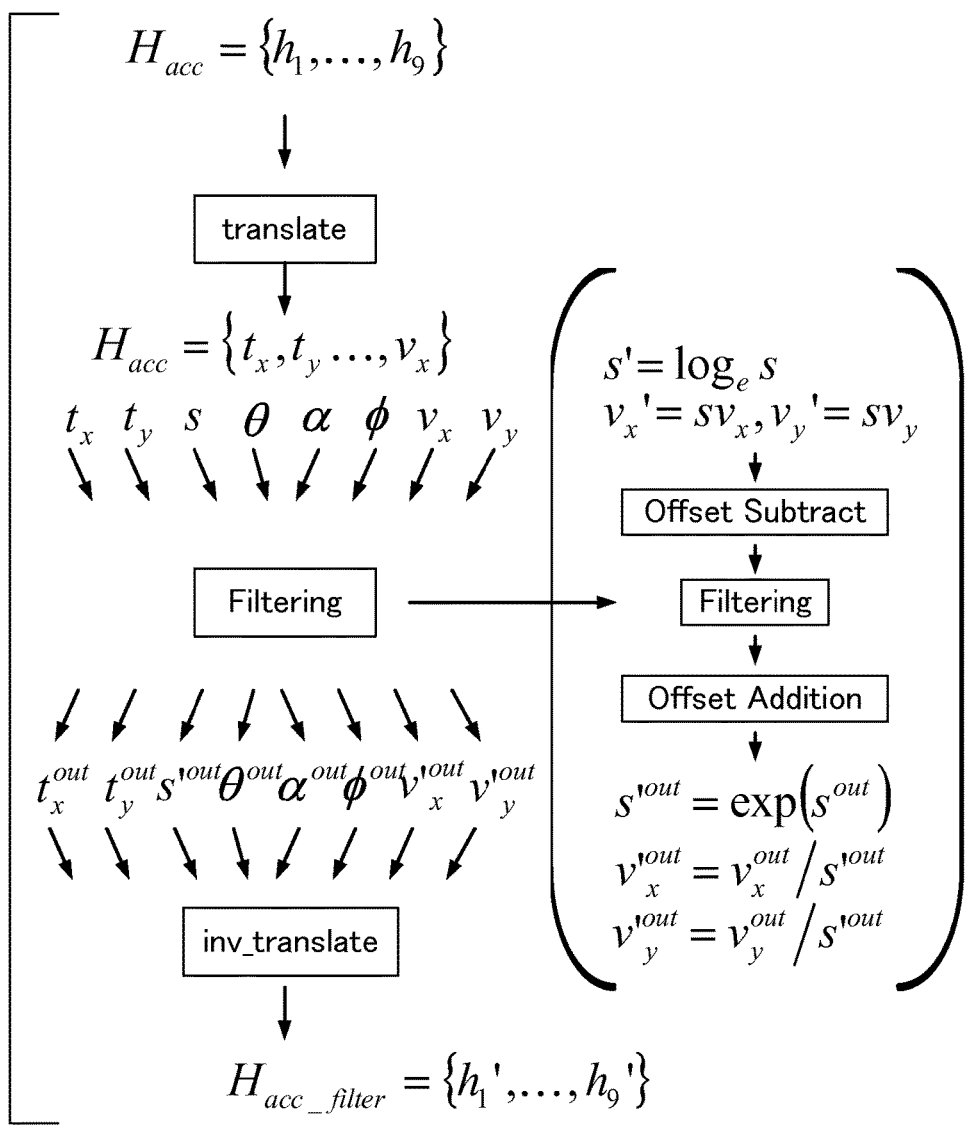
FIG. 8 is a diagram illustrating a filtering process.

FIG. 8 is a diagram illustrating a filtering process of FIG. 6 and homography filtering (S702) of FIG. 7.

The correction amount calculation unit 00502 converts projective homography expressed as a multidimensional amount into a one-dimensional amount. Also, the correction amount calculation unit 00502 digitally filters a time series thereof. The correction amount calculation unit 00502 then restores a result of filtering the one-dimensional amount to obtain homography after filtering that is a multidimensional amount.

Calculation of the amount of correction based on the camera work (the amount of correction of the position and posture) will be described. The correction amount calculation unit 00502 calculates a trajectory by performing integration on the change in the position and posture of the image pickup apparatus. Further, by similarly performing filtering on the integration value, an amount of correction of the trajectory of the position and posture can be obtained. When the change in the position and posture of the image pickup apparatus is small, the integration of the trajectory may be approximated and integrated for each position change and posture change of each axis. On the other hand, when the posture change is great, the integration is performed by rotating an axis of the integration of the position change based on the change in the posture so as to calculate the position change (Reference 1). In time series filtering in this embodiment, digital filtering was used. However, for separation into the amount of image change related to intended camera work and an unintended motion of the camera, other filtering schemes may be used.

When the correction amount calculation unit 00502 has calculated the amount of correction of the position and posture from an integration value of the position and posture change, this amount of correction is converted into an amount of geometric deformation of the image in a homography representation used for geometric deformation.

For example, when a case in which only three-axis rotation of the motion is detected and corrected is assumed, homography of a geometric deformation parameter is given.

$$H = \begin{bmatrix} a & b & c \\ d & e & f \\ g & h & i \end{bmatrix} = \begin{bmatrix} \cos(-\alpha R) & -\sin(-\alpha R) & 0 \\ \sin(-\alpha R) & \cos(-\alpha R) & 0 \\ 0 & 0 & 1 \end{bmatrix}$$

$$\begin{bmatrix} \cos(-\alpha Y) & 0 & \sin(-\alpha Y) \\ 0 & 1 & 0 \\ -\sin(-\alpha Y) & 0 & \cos(-\alpha Y) \end{bmatrix} \begin{bmatrix} 1 & 0 & 0 \\ 0 & \cos(-\alpha P) & -\sin(-\alpha P) \\ 0 & \sin(-\alpha P) & \cos(-\alpha P) \end{bmatrix}$$

R, P, and Y indicate amounts of correction for roll, pitch, and yaw rotations of the camera with respect to the optical axis, respectively. α indicates a shake suppression rate. A negative sign indicates shake suppression. For the position of the image pickup apparatus, an amount of correction of the position is similarly calculated, and then an amount of geometric deformation for each pixel can be calculated using depth information of each pixel of the image.

As the number of taps of the filter increases, in other words, as the change in the position and posture at a low frequency is further suppressed, an amount of delay increases. This is the same as increasing a feedback gain in an FIR filter or a Karman filter. When the real-time anti-shake process is to be realized using filter processing, only the shake/camera work for correction amount calculation is used until a point in time of the correction amount calculation in the correction amount calculation, and thus, in order to reduce the delay, anti-shake effects should be suppressed based on a physical principle law.

In step S2013 of FIG. 3, the image geometric deformation anti-shake unit 00503 applies geometric deformation of the anti-shake to the input image. For example, in the case of the image change expressed in projective homography, the image geometric deformation anti-shake unit 00503 applies the projective deformation based on the homography of the amount of correction corresponding to the current frame. In order to obtain a high-quality image, the geometric deformation is realized, for example, by backward mapping.

Figure 9:
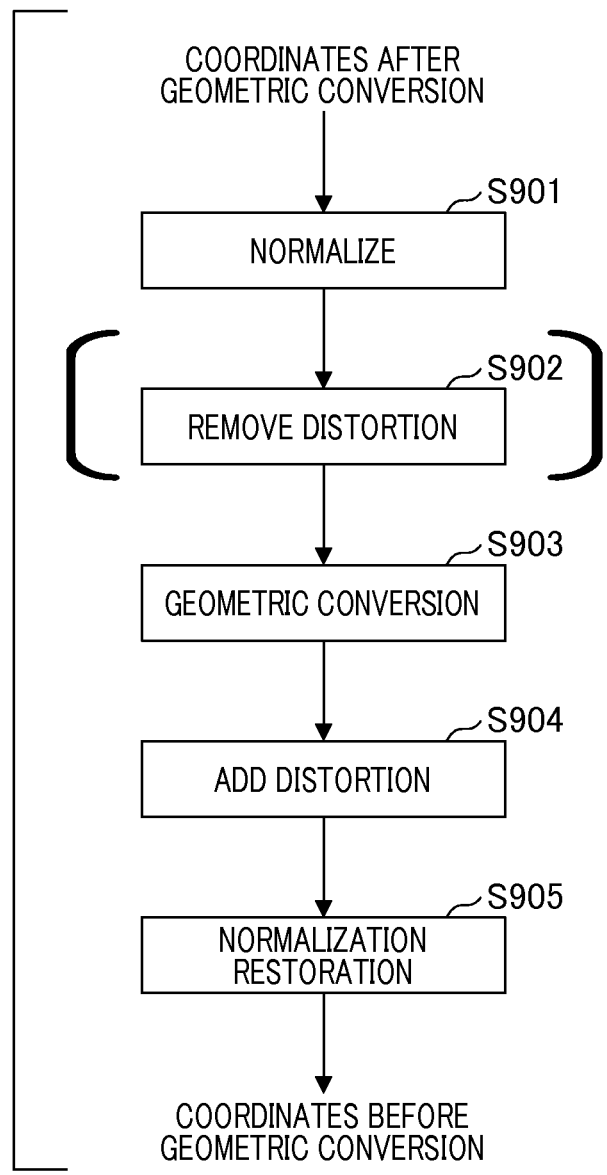
FIG. 9 is a diagram illustrating backward mapping.

FIG. 9 is a flowchart illustrating a process of calculating a pixel coordinate position before geometric conversion corresponding to a pixel coordinate position after geometric conversion in the backward mapping.

The image geometric deformation anti-shake unit 00503 calculates a pixel coordinate position before geometric conversion corresponding to a pixel coordinate position after geometric conversion, and calculates a pixel value of the pixel coordinate position through interpolation. This procedure is performed on all pixel positions after geometric conversion to obtain a frame after the anti-shake process.

First, the image geometric deformation anti-shake unit 00503 performs a normalization process (step S901). Specifically, the image geometric deformation anti-shake unit 00503 converts pixel coordinates of the frame after the anti-shake process into a coordinate value on a normalized image coordinate system. That is, the image geometric deformation anti-shake unit 00503 obtains image coordinates in a camera coordinate system of a focus distance from which influence of internal camera parameters has been removed.

The image geometric deformation anti-shake unit 00503 converts the pixel coordinates into the coordinate value on the normalized image coordinate system using the internal parameters including the focus distance fc_new after the anti-shake process. Inv( ) indicates an inverse matrix of a matrix in parentheses.

$$\begin{bmatrix} u'_d \\ v'_d \\ 1 \end{bmatrix} = inv\left( \begin{bmatrix} f_{c\_new}k_u & 0 & u_0 \\ 0 & f_{c\_new}k_v & v_0 \\ 0 & 0 & 1 \end{bmatrix} \right) \begin{bmatrix} x'_i \\ y'_j \\ 1 \end{bmatrix}$$

Then, the image geometric deformation anti-shake unit 00503 executes a distortion removal process (step S902). Specifically, the image geometric deformation anti-shake unit 00503 removes distortion applied to the image after the geometric conversion. Usually, the video after the geometric conversion is assumed to be a non-distorted video. Therefore, when an output video is the non-distorted video, this step is omitted (($u_d'$, $v_d'$)→(u', v')).

On the other hand, when the output video is a distorted video, non-distortion coordinates (u', v') on the normalized image coordinates are calculated from distortion coordinates (ud', vd'). That is, the image geometric deformation anti-shake unit 00503 obtains the non-distortion coordinates (u', v') in the following procedure.

$$r^2 = u_d'^2 + v_d'^2$$

$$K = 1 + k_1 r + k_2 r^2 + k_3 r^3 + \ldots$$

$$u' = u_d'/K, v' = v_d'/K$$

Then, the image geometric deformation anti-shake unit 00503 performs, for example, inverse conversion of the anti-shake correction on the normalized image coordinates as geometric deformation (step S903). When a geometric conversion matrix indicating an amount of correction of the anti-shake is assumed to be a 3×3 matrix H, this is backward matching, and thus an inverse matrix inv(H) thereof is applied to a normalized coordinate point (u', v').

$$\begin{bmatrix} u_p \\ v_p \\ m \end{bmatrix} = inv(H) \begin{bmatrix} u' \\ v' \\ 1 \end{bmatrix}, u = u_p/m, v = v_p/m$$

Accordingly, the normalized image coordinates (u, v) before the anti-shake correction are obtained. Then, the image geometric deformation anti-shake unit 00503 executes distortion addition (effect processing) (step S902). Specifically, the image geometric deformation anti-shake unit 00503 applies effects such as cutting and resizing to the image after the geometric deformation in step S903. Further, the image geometric deformation anti-shake unit 00503 may perform perspective correction at a wide angle or the like. For example, a process of adding distortion to reduce perspective influence is considered as the perspective correction. The image geometric deformation anti-shake unit 00503 adds an effect caused by distortion in a radiation direction using a formula below. Auxiliary information regarding content of this geometric deformation includes effect information regarding effect processing. The effect information includes resizing information regarding the resizing, and perspective correction information regarding the perspective correction.

$$\begin{bmatrix} u_d \\ v_d \end{bmatrix} = (1 + k_1 r + k_2 r^2 + k_3 r^3 + \ldots) \begin{bmatrix} u \\ v \end{bmatrix}, r^2 = u^2 + v^2$$

k1, k2, and k3 indicate first, second, and third distortion coefficients in a radiation direction, respectively.

Then, the image geometric deformation anti-shake unit 00503 executes normalization restoration (step S905). Specifically, the image geometric deformation anti-shake unit 00503 applies the internal parameter of the camera to the normalized image coordinates ($u_d$, $v_d$) before the anti-shake correction to which the distortion has been applied, to obtain the pixel coordinates on the input frame.

$$\begin{bmatrix} x \\ y \\ 1 \end{bmatrix} = \begin{bmatrix} f_u k_u & f_u k_u \cot\phi & u_0 \\ 0 & f_v k_v \sin\phi & v_0 \\ 0 & 0 & 1 \end{bmatrix} \begin{bmatrix} u_d \\ v_d \\ 1 \end{bmatrix}$$

The image geometric deformation anti-shake unit 00503 samples the pixel value at the pixel coordinates through interpolation such as bicubic interpolation to obtain the pixel value of each pixel of the frame after the anti-shake process. The geometry conversion process is completed by performing backward mapping on all of the frames after the anti-shake process. Through the above-described processing steps, the first anti-shake process is performed on each frame of the video signal.

While the anti-shake process based on the projective homography and the anti-shake process based on the rotation of the camera have been described above, a geometrically correct anti-shake process, also including parallax, may be performed based on the amount of correction of the position and posture of the image pickup apparatus. A technology disclosed in Reference 9 can be applied to the geometric deformation of the geometrically correct image according to the change in the position and posture and mapping of each pixel.

Reference 9: F. Liu, et al., "Content-Preserving Warps for 3D Video Stabilization," SIGGRAPH2009.

Referring back to FIG. 2, in a recording process (S202), the first anti-shake unit 005 records the image data (video stream) after the first anti-shake process on the recording unit 006. The first anti-shake unit 005 encodes a video stream subjected to the anti-shake in a video recording format expressed by NTSC, MPEG4, moving image RAW, or the like, in a coding and decoding unit, which is not illustrated, and records a resultant video stream on the recording unit 006.

Figure 10:
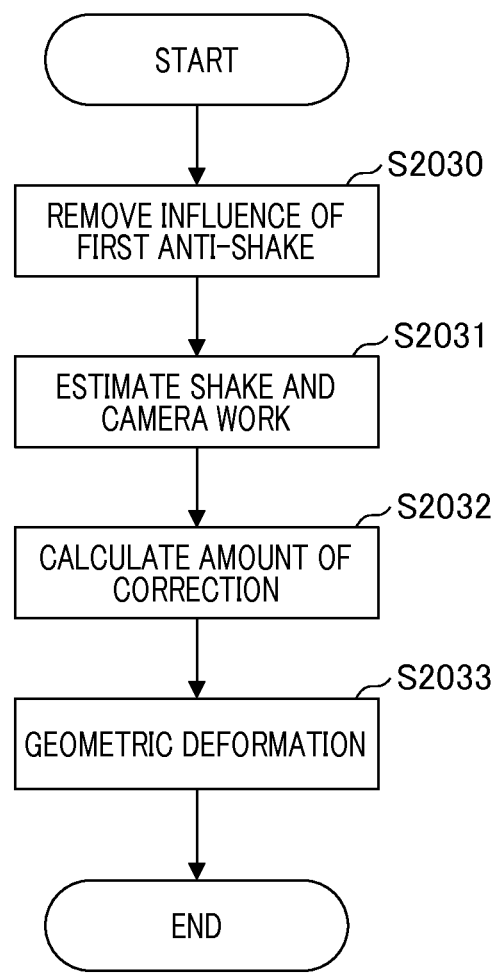
FIG. 10 is a flowchart illustrating a second anti-shake process.

FIG. 10 is a flowchart illustrating the second anti-shake process in step S203 of FIG. 2.

The control unit 00700 of the second anti-shake unit 007 performs re-anti-shake as offline processing on the image data after the first anti-shake process recorded on the recording unit 006. Since this is offline processing, an image change or a position and posture change of the image pickup apparatus for a future frame is available when filtering of the image change or the position and posture change of the image pickup apparatus for a current frame is performed. Further, a problem with delay of displaying a live view, or the like, on a display unit (not illustrated), is not a concern, unlike a real-time case. Accordingly, a filtering process with a very large number of taps is applicable. As a result, high-quality anti-shake is possible.

A basic process of shake and camera work estimation (S2031) in FIG. 10 is the same as the shake and camera work estimation (S2011) shown in FIG. 3. Basic processing in correction amount calculation (S2032) is the same as the correction amount calculation (S2012) shown in FIG. 3.

Further, basic processing in geometric deformation (S2033) is the same as the geometric deformation (S2013) shown in FIG. 3.

When it is assumed that the shake and camera work estimation unit 00701 performs camera work estimation based on the image vector in which a pinhole camera is assumed in the second anti-shake process, similarly to the camera work estimation in the first anti-shake process, there are the following problems. That is, when the anti-shake in which the pinhole camera assumption collapses is performed in the first anti-shake process, the camera work estimation cannot be correctly performed. For example, when a translation component of the image based on rotation of the image pickup apparatus is detected as an image change and corrected in the first anti-shake process, the rotation cannot be correctly estimated in the second anti-shake process, and tilt or scaling that is a residual component of the image change remains. Further, when the translation component of the image based on the translation of the image pickup apparatus is corrected in the first anti-shake process, the translation cannot be correctly estimated in the second anti-shake process, and parallax cannot be corrected.

Further, even when effect processing such as resizing or perspective correction is applied in the first anti-shake process, the pinhole camera assumption collapses, and thus, the camera work estimation cannot be correctly executed in the second anti-shake process.

The anti-shake process in which the pinhole camera assumption does not collapse includes, for example, a geometrically correct correction that is based on a formula for correction of the camera work based on rotation of an image pickup apparatus or a geometrically correct three-dimensional correction process based on translation of an image pickup apparatus. An example of the anti-shake process in which the pinhole camera assumption collapses is anti-shake correction in which only translation is corrected for an image change based on the rotation of the image pickup apparatus. Further, another example of the anti-shake process in which the pinhole camera assumption collapses is anti-shake correction in which only translation is similarly corrected for an image change based on the translation of the image pickup apparatus.

Therefore, in this embodiment, the first anti-shake unit 005 records auxiliary information regarding content of the anti-shake process in which the pinhole camera assumption applied in the first anti-shake process collapses on the recording unit 006 together with the image data after the anti-shake process. Also, in step S2030 of FIG. 10, the control unit 00700 performs an anti-shake influence removal process to remove influence of the first anti-shake process based on the auxiliary information. In this embodiment, the auxiliary information is assumed to be an image change component of the geometrically deformed captured image. The control unit 00700 controls the respective processing units in the second anti-shake unit 007 to remove the influence of the anti-shake process in which the pinhole camera assumption applied in the first anti-shake process collapses, through geometric deformation, or to cause the influence to be considered on a coordinate operation in the shake/camera work estimation. That is, each of the estimation processes for camera work and the geometric deformation of the captured image includes a process of removing influence of the anti-shake process in which the pinhole camera assumption collapses, which is executed by the first anti-shake unit 005.

For example, when the first anti-shake process is translation correction, the camera work estimation unit 00701 estimates the shake/camera work based on a motion vector extracted not to be subjected to the translation correction. Further, the image geometric deformation anti-shake unit 00703 cancels the translation correction in the first anti-shake process once and then performs geometric deformation.

Even when the first anti-shake process is the anti-shake process in which the pinhole camera assumption does not collapse, the camera work information including the position and posture of the image pickup apparatus obtained in the shake and camera work estimation process in the first anti-shake process is not appropriate correction information or initial information of the estimation in the second anti-shake process. Therefore, in this embodiment, when change information of the position and posture obtained in the first anti-shake process is used in the shake and camera work estimation (step S2031) of the second anti-shake process, the following process is executed. That is, the first anti-shake unit 005 records the position and posture change information indicating the change in the position and posture of the image pickup apparatus 100 after the application of the geometric deformation (S2013) of FIG. 3 on the recording unit 006 together with the image data after the anti-shake process. Also, the shake and camera work estimation unit 00701 estimates shake/camera work using the position and posture change information in the recording unit 006. Accordingly, an initial value that is appropriate when the change in the position and posture of the image pickup apparatus and the image change are calculated is available, and thus, it is possible to realize high precision of the processing result and large reduction of the amount of calculation.

Embodiment 2

Figure 11:
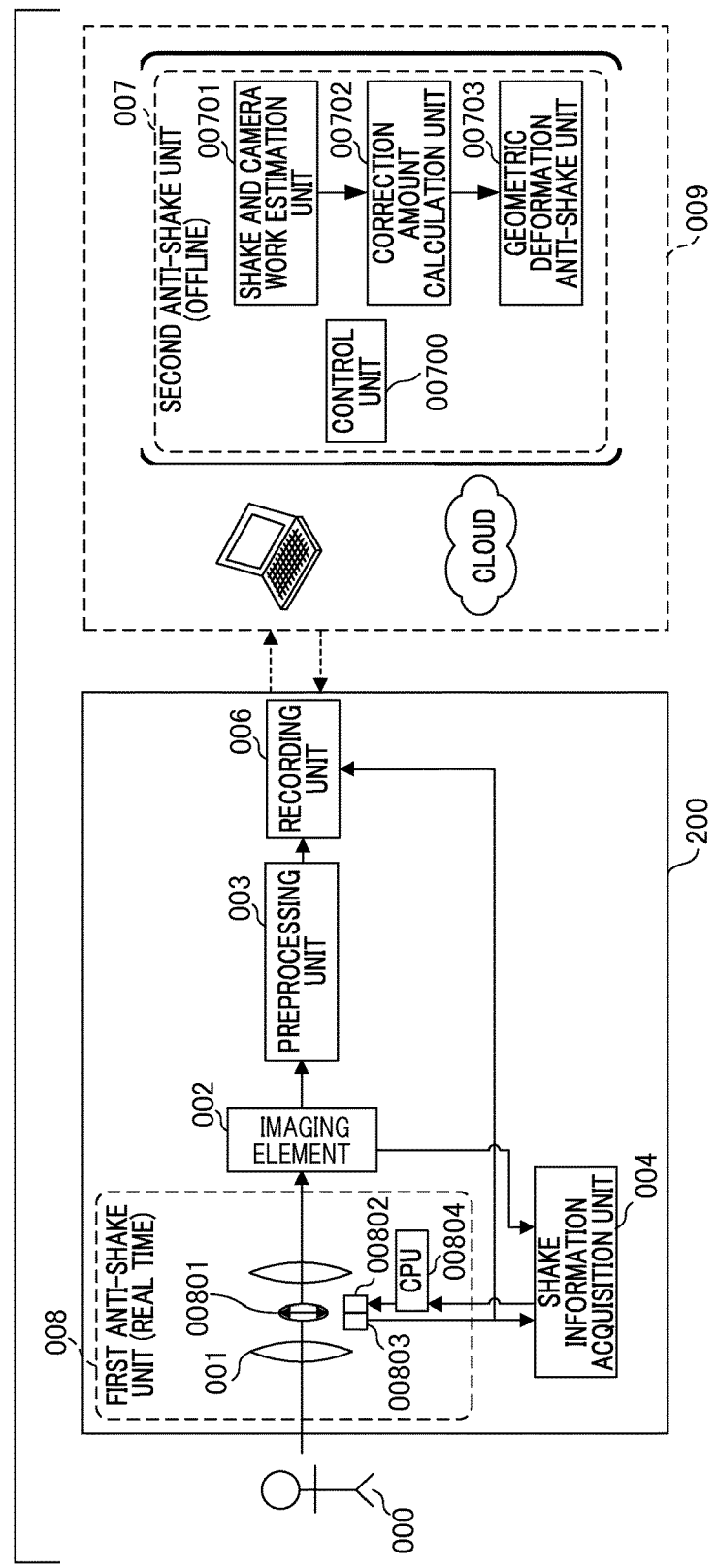
FIG. 11 is a diagram illustrating a system configuration of Embodiment 2.

FIG. 11 is a diagram illustrating a system configuration of Embodiment 2.

An information processing system illustrated in FIG. 11 includes an image pickup apparatus 200, and an information processing apparatus 009. This information processing apparatus is realized by a cloud service including a plurality of server groups, a PC, or the like. The information processing apparatus 009 is connected to the image pickup apparatus 200 via a network. Description of the same configuration in the information processing system of FIG. 11 as that of the image pickup apparatus 100 in FIG. 1 will be omitted.

A first anti-shake unit 008 included in the image pickup apparatus 200 realizes a first anti-shake process by optically correcting shake (image shake) of a captured image occurring due to shake of the device (performing optical anti-shake).

The first anti-shake unit 008 includes, for example, a shake correction member 00801, a control unit 00802, and a position detection unit 00803. Of course, the first anti-shake unit 008 may correct the shake of the captured image through the geometric deformation, as in Embodiment 1.

When the anti-shake is optically performed, the image pickup apparatus 200 drives some lenses, which are the correction member 00801 for correcting the image shake, and translates a position of an optical image on the imaging element. The correction member 00801 is driven based on information from a shake information acquisition unit 004 to realize general optical anti-shake. The control unit 00802 is controlled in response to an instruction from a CPU 00804. The CPU 00804 has a function of a correction amount calculation unit that holds a camera parameter such as a focus distance or a coefficient regarding driving and, for example, calculates an amount of correction based on element information of shake obtained from the shake information acquisition unit. The CPU 00804 converts the amount of correction into an amount of driving of the correction member 00801 based on the camera parameter or the driving coefficient, and sends a driving instruction to the control unit 00802.

The position detection unit 00803 measures an amount of translation of the correction member 00801 that performs optical anti-shake. Specifically, the position detection unit 00803 calculates information for monitoring a position of an image center moved due to the translation of the correction member 00801 and a change speed thereof. The image center is a point of intersection between an optical axis of an optical system and a sensor. Further, it is understood that the amount of translation of the optical image is equivalent to the amount of image center translation. The amount of translation is basically obtained through a physical component, such as a Hall element or an encoder. The position detection unit 00803 calculates an output value based on an amount of measurement of the amount of translation of the correction member 00801. A calibration coefficient may be used to calculate the accurate amount of movement. However, when high precision is unnecessary, the output value may be calculated even through direct conversion of control information for the correction member 00801 output from the control unit 00802.

The type of the first anti-shake unit 008 is not a type in which the correction member 00801, which is a part of the optical system 001, is driven, but may be a sensor shift type in which the imaging element 002 is moved in a vertical direction with respect to the optical axis of the optical system. When the first anti-shake unit 008 is the sensor shift type, the first anti-shake unit 008 records an output value obtained by converting an amount of driving shift of the sensor into an amount of translation of the image as auxiliary information, which is a monitoring parameter, regarding the anti-shake process.

The amount of translation of the image is a physical amount indicating an amount of a change in coordinates caused by translation of a video due to the optical anti-shake effects. However, when the optical system 001 is a zoom lens, if there is a change in the focus distance, the amount of translation of the video is changed even when an amount of rotation of a camera given from a posture sensor is equaled. Therefore, the amounts may be treated as a set of a plurality of physical amounts for control including the amount of rotation or the amount of translation of the camera, and the focus distance in consideration of the ease of handling of control. For example, one of pieces of optical anti-shake control information is determined as a value for performing scaling to be the amount of translation of the image on the sensor surface if the optical anti-shake control information is multiplied by the focus distance of the optical system. That is, if the camera rotation is expressed as $\theta$, the amount may be treated as an angle in the form of:

$$Sh = f \tan\theta \approx f\theta, \theta = \tan(Sh/f) \approx Sh/f$$

In this case, when the optical anti-shake mechanism is in a neutral position, an amount of shift of the lens is assumed to be equal to zero. If the focus distance is treated in units of pixels of the image, a correction angle can be treated as an amount of translation on the image.

An amount of lens shift in a Yaw direction with respect to an optical axis of the camera is Shy, and an amount of lens shift in a Pitch direction is Shp. Movement of a display area in the first anti-shake process (optical anti-shake) can be canceled in the second anti-shake process in a form:

$$x_{rev} = x - Shy_{-1},$$

$$y_{rev} = y - Shp_{-1},$$

$$x'_{rev} = x' - Shy,$$

$$y'_{rev} = y' - Shp$$

Here, Shy and Shp indicate amounts of anti-shake shift in the current frame, and $Shy_{-1}$ and $Shp_{-1}$ indicate amounts of anti-shake shift in an immediately previous frame.

The information processing apparatus 009 exchanges the image and the auxiliary information with the image pickup apparatus 200 via an external input and output I/F to execute the second anti-shake process. The external input and output I/F includes a wireless LAN, which is not illustrated, or a cable such as a USB, and an I/F to which a solid-state medium such as an SD card can be connected.

Since the flowchart illustrating the first and second anti-shake processes in Embodiment 2 is the same as that in Embodiment 1, a detailed description thereof will be omitted.

In Embodiment 2, the first anti-shake process is realized by optical anti-shake to drive some of the lenses or the imaging element. This corresponds to the process of estimating the image change of the translation in the geometrical deformation estimation of the image and correcting a translation element included in the projective deformation homography in Embodiment 1. Also, this optical anti-shake becomes anti-shake correction that collapses the pinhole camera assumption in advanced shake and camera work estimation.

The image data recorded on the recording unit 006 is transferred to the information processing apparatus 009 via a network. The information processing apparatus 009 executes the second anti-shake process while performing the control process of removing influence of the first anti-shake process.

According to this embodiment, an advantage of real-time anti-shake within a device in which a video is immediately viewed is maintained, and an advanced offline anti-shake process can be performed later. Further, it is possible to reduce an anti-shake margin area at the time of recording, and to reduce offline processing computer capability requirements.

The configuration of Embodiment 1 and the configuration of Embodiment 2 may be appropriately combined. For example, the image pickup apparatus 100 of FIG. 1 may execute the optical anti-shake process as the first anti-shake process, and the image pickup apparatus 200 of FIG. 11 may execute a geometrical deformation anti-shake process as the first anti-shake process.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)), and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor operatively coupled to a memory, serving as:
(a) a first anti-shake unit configured to execute an anti-shake process on image data relating to a captured image, and to record image data after the anti-shake process on a recording unit; and
(b) a second anti-shake unit configured to execute a re-anti-shake process while performing a control process of removing influence of the anti-shake process, which adversely affects the re-anti-shake process executed by the second anti-shake unit, executed by the first anti-shake unit on the image data, after the anti-shake process recorded on the recording unit, based on auxiliary information regarding the anti-shake process output by the first anti-shake unit,
wherein the first anti-shake unit performs (i) a first geometric deformation anti-shake process of correcting shake occurring in the captured image by performing geometric deformation on the captured image, and (ii) an optical anti-shake process of correcting the shake occurring in the captured image by outputting a driving signal to a shake correction unit, and the second anti-shake unit executes a second geometrical deformation anti-shake process.

2. The image processing apparatus according to claim 1, wherein the first anti-shake unit records the auxiliary information on the recording unit together with the image data after the anti-shake process, and the second anti-shake unit performs the control process of removing the influence of the anti-shake process executed by the first anti-shake unit, based on auxiliary information recorded on the recording unit.

3. The image processing apparatus according to claim 1, wherein the second anti-shake unit executes the second geometrical deformation anti-shake process by executing an estimation process for camera work, calculating an amount of anti-shake correction based on the estimated camera work, and executing geometric deformation on the captured image based on the amount of correction, and wherein the estimation process for the camera work and the geometric deformation for the captured image respectively include a process of removing influence of the anti-shake process that pinhole camera assumption collapses, which is executed by the first anti-shake unit.

4. The image processing apparatus according to claim 3, wherein the auxiliary information includes an image change component of the captured image subjected to the first geometrical deformation process.

5. The image processing apparatus according to claim 4, wherein the first geometric deformation includes effect processing, and the auxiliary information includes effect information that is information regarding the effect processing.

6. The image processing apparatus according to claim 5, wherein the effect processing includes resizing and perspective correction, and the effect information includes resizing information regarding the resizing, and perspective correction information regarding the perspective correction.

7. The image processing apparatus according to claim 3, wherein the first anti-shake unit executes the optical anti-shake process, and the auxiliary information includes an amount of driving shift of the shake correction unit.

8. The image processing apparatus according to claim 3, wherein the first anti-shake unit outputs position and orientation change information indicating a change in a position and an orientation of the image processing apparatus, after the first anti-shake process is executed, together with the auxiliary information, and the second anti-shake unit executes the estimation process for camera work by using the position and orientation change information.

9. An image pickup apparatus comprising:
the image processing apparatus according to claim 3; and
an imaging element.

10. A method of controlling an image processing apparatus, the method comprising:
executing an anti-shake process on image data relating to a captured image, and recording image data after the anti-shake process on a recording unit; and
executing a re-anti-shake process while performing a control process of removing influence of the anti-shake process, which adversely affects the re-anti-shake process, on the image data, after the anti-shake process recorded on the recording unit, based on auxiliary information regarding the anti-shake process,
wherein, in the anti-shake process, (i) a first geometric deformation anti-shake process of correcting shake occurring in the captured image by performing geometric deformation on the captured image, and (ii) an optical anti-shake process of correcting the shake occurring in the captured image by outputting a driving signal to a shake correction unit are performed, and, in the re-anti-shake process, a second geometrical deformation anti-shake process is performed.

11. A system comprising an image pickup apparatus and an information processing apparatus that are connected through a network, the system comprising:
a first information processing apparatus configured to execute an anti-shake process on image data relating to a captured image, to record image data after the anti-shake process on a recording unit, and to output auxiliary information regarding the anti-shake process; and
a second information processing apparatus configured to execute a re-anti-shake process while performing a control process of removing influence of the anti-shake process, which adversely affects the re-anti-shake process executed by the second information processing apparatus, executed by the first information processing apparatus on the image data, after the anti-shake process recorded on the recording unit, based on the auxiliary information, wherein the first information processing apparatus performs (i) a first geometric deformation anti-shake process of correcting shake occurring in the captured image by performing geometric deformation on the captured image, and (ii) an optical anti-shake process of correcting the shake occurring in the captured image by outputting a driving signal to a shake correction unit, and the second information processing apparatus executes a second geometrical deformation anti-shake process.

* * * * *